US010373377B1

(12) United States Patent
Niewiadomski

(10) Patent No.: US 10,373,377 B1
(45) Date of Patent: Aug. 6, 2019

(54) AUGMENTED REALITY ASSISTED DELIVERIES

(71) Applicant: Amazon Technologies, Inc., Seattle, WA (US)

(72) Inventor: Robert Niewiadomski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 15/334,458

(22) Filed: Oct. 26, 2016

(51) Int. Cl.
*G06T 19/00* (2011.01)
*G02B 27/01* (2006.01)
*H04L 12/24* (2006.01)
*H04L 29/06* (2006.01)
*H04L 29/08* (2006.01)

(52) U.S. Cl.
CPC .......... *G06T 19/003* (2013.01); *G02B 27/017* (2013.01); *G06T 19/006* (2013.01); *H04L 41/046* (2013.01); *H04L 67/18* (2013.01); *H04L 67/38* (2013.01); *G02B 2027/0178* (2013.01); *G06T 2219/004* (2013.01)

(58) Field of Classification Search
USPC ............................................................. 345/8
See application file for complete search history.

(56) References Cited

U.S. PATENT DOCUMENTS

| | | | |
|---|---|---|---|
| 6,321,158 B1 * | 11/2001 | DeLorme ............... | G01C 21/26 340/995.16 |
| 6,405,215 B1 * | 6/2002 | Yaung .................... | G06Q 10/10 |
| 6,408,257 B1 * | 6/2002 | Harrington ............. | G06T 11/00 348/14.16 |
| 2005/0251330 A1 * | 11/2005 | Waterhouse ........... | G08G 1/202 701/465 |
| 2009/0048890 A1 * | 2/2009 | Burgh .................... | G06Q 10/04 705/7.15 |
| 2012/0130916 A1 * | 5/2012 | Neal ...................... | G06Q 10/08 705/339 |
| 2012/0194420 A1 * | 8/2012 | Osterhout .......... | G02B 27/0093 345/156 |
| 2013/0278635 A1 * | 10/2013 | Maggiore ............. | G06T 19/006 345/633 |
| 2014/0089015 A1 * | 3/2014 | Stefik ..................... | G06Q 10/08 705/5 |

(Continued)

*Primary Examiner* — Chineyere D Wills-Burns
(74) *Attorney, Agent, or Firm* — Thomas Horstemeyer, LLP

(57) ABSTRACT

Disclosed are various embodiments for providing augmented reality assisted deliveries. Some embodiments include determining a current location of a client device and a next node in a delivery workflow based at least in part on the current location of the client device. Then, the client device renders the next node in the delivery workflow on an augmented reality display linked to the client device. Various embodiments can also include identifying a plurality of delivery workflows that include a destination node that corresponds to a delivery and selecting select a delivery workflow from the plurality of delivery workflows based at least in part on a delivery constraint. In these embodiments, a delivery route to a routing node is generated, wherein the routing node comprises an entry to the selected delivery workflow. The delivery route and the delivery workflow are then sent to an augmented reality client.

20 Claims, 9 Drawing Sheets

(56) References Cited

U.S. PATENT DOCUMENTS

| | | | |
|---|---|---|---|
| 2015/0074506 A1* | 3/2015 | Dunn | G06F 21/6218 715/230 |
| 2016/0104112 A1* | 4/2016 | Gorlin | G06F 16/29 705/338 |
| 2016/0196756 A1* | 7/2016 | Prakash | B64C 39/024 701/3 |

* cited by examiner

AUGMENTED REALITY ASSISTED DELIVERIES

BACKGROUND

Experienced delivery agents often learn information about the delivery routes and delivery areas that is not reflected in a delivery route generated by a routing application. This information can include, for example, the most efficient or best places to park when making a delivery to a destination or group of destinations, instructions for accessing a delivery location (e.g., gate codes, locations of delivery entrances, etc.), and other information. If a new or different delivery agent were assigned to the delivery route, he or she might not be as efficient as the previous delivery agent due to a lack of awareness of the additional route information.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for using augmented reality to capture and present delivery route information to delivery agents. Individual points on a delivery workflow can be identified. These points can include routing points (e.g., way points) a delivery agent should traverse, parking points indicating where a delivery agent can or should park, access points (e.g., service elevators, delivery entrances, gates, etc.) for gaining entry to a site, and delivery destination points. Moreover, a delivery agent can annotate or otherwise add additional information to these individual points in the delivery workflow. For example, a delivery agent could indicate whether a particular routing point is accessible or inaccessible to a particular type of vehicle (e.g., no vehicles over 1-ton, pedestrian only, etc.). As another example, a delivery agent could add information about a parking lot represented by parking point (e.g., vehicles under six feet only, payment required, etc.), information about an access point (e.g., access code for delivery agents to use to enter a service elevator), or a delivery destination point (e.g., hours of operation). This information can then be presented to another delivery agent in real time using an augmented reality interface. In the following discussion, a general description of the system and its components is provided, followed by a discussion of the operation of the same.

Figure 1:
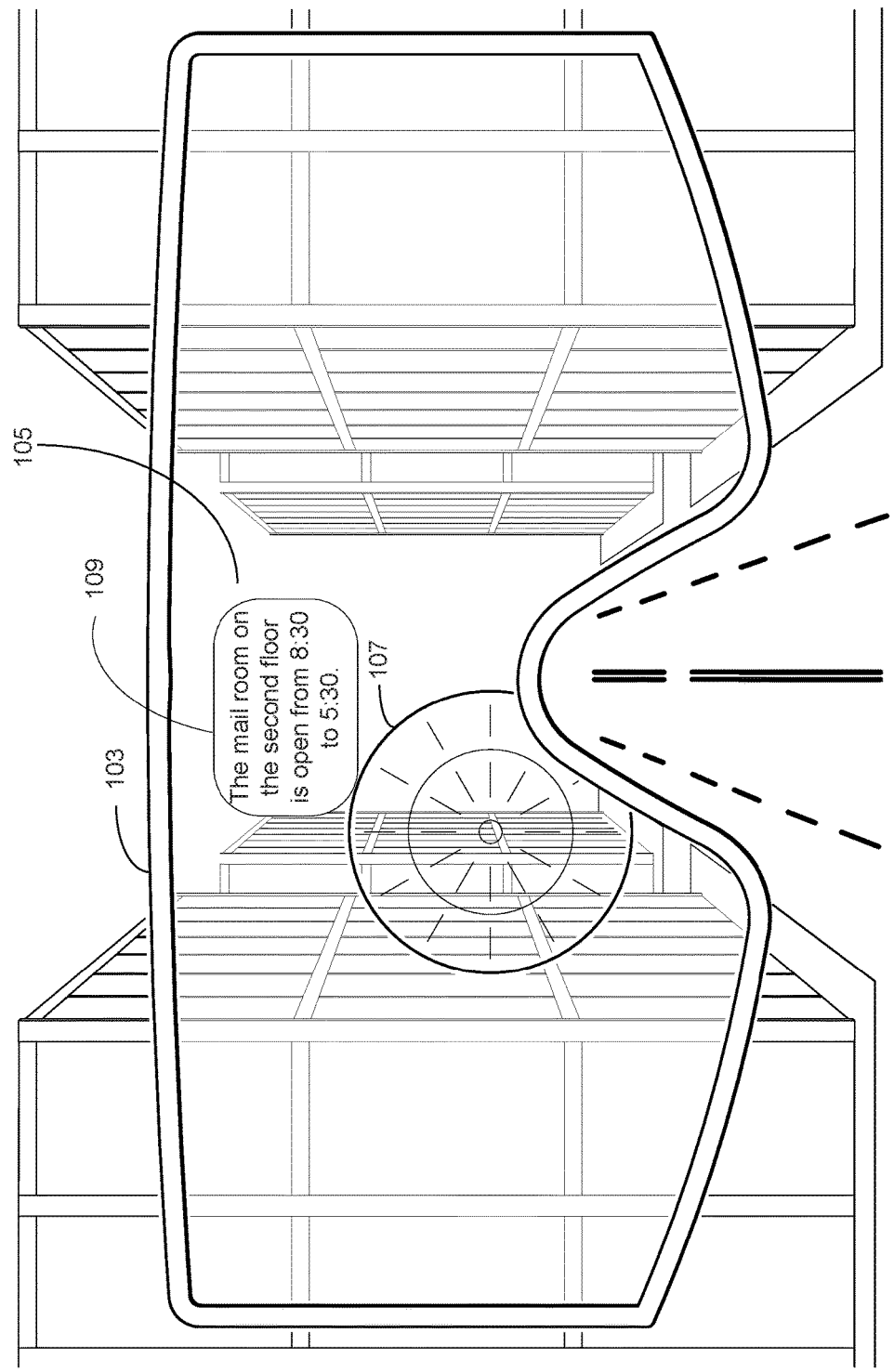
FIG. 1 is a drawing depicting one of several embodiments of the present disclosure.

As illustrated in FIG. 1, an augmented reality client device 103 can be used to overlay a user interface on a display 105 to augment a user's perception of the physical world. The display 105 can include one or more user interface elements to assist a delivery agent in completing a delivery. For example, a marker 107 could be rendered on top of a physical location to direct a delivery agent to a location. In addition, a data balloon 109 could be rendered on the display 105 to provide the delivery agent with relevant information about the location highlighted with the marker 107.

Additional functions may be provided by the augmented reality client device 103. For example, the augmented reality client device 103 may allow a user to zoom-in or zoom out to view a three-dimensional model of the area the delivery agent is view. For instance, the augmented reality client device 103 may permit a user to zoom out to view a three-dimensional model of the area around a delivery destination in order to determine a best approach to the delivery destination. As another example, the augmented reality client device 103 may permit a user to zoom in to view a detailed three-dimensional model of the physical location highlighted by the marker 107.

Figure 2:
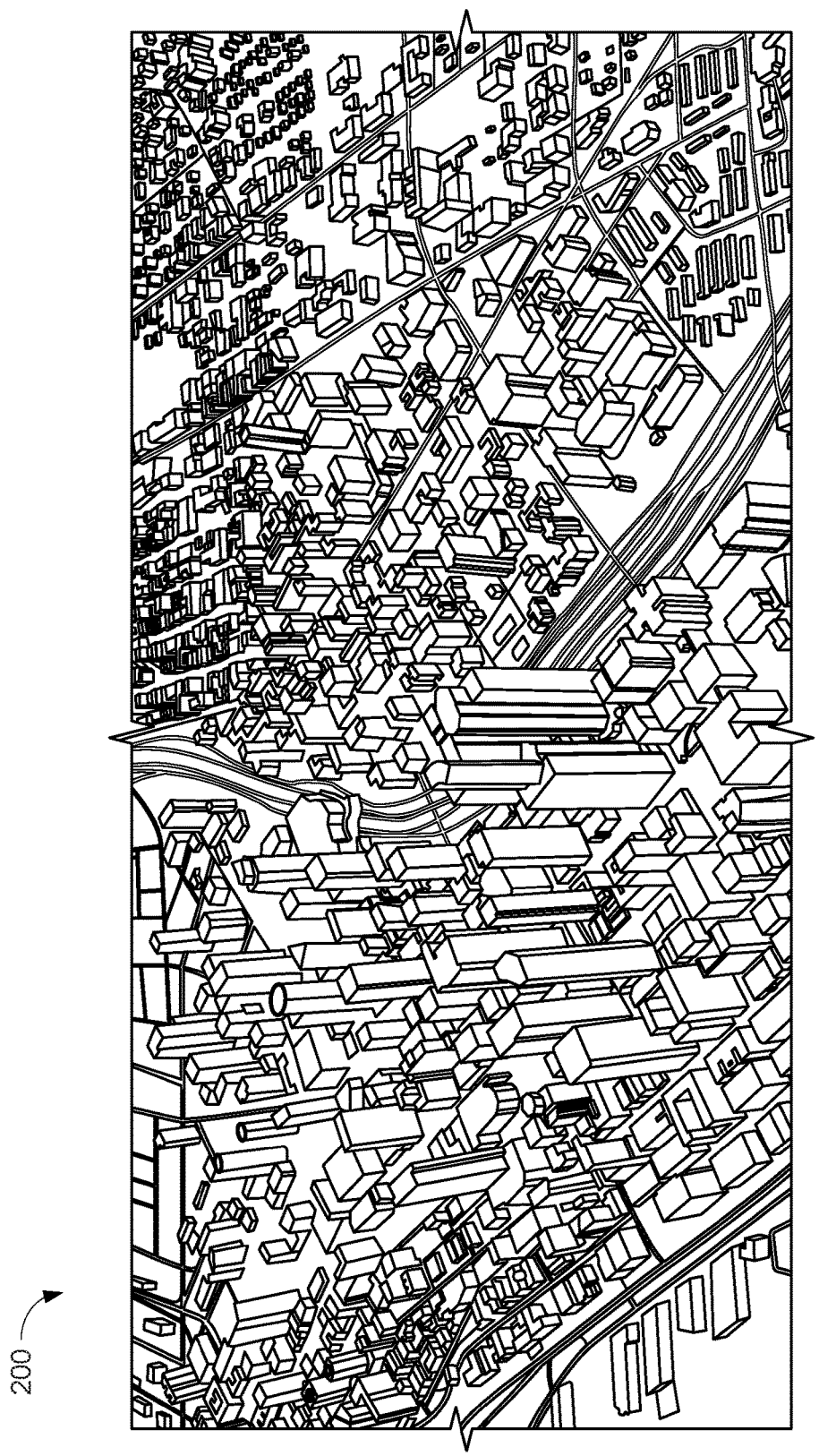
FIG. 2 is a drawing depicting a three-dimensional model used in various embodiments of the present disclosure.

FIG. 2 illustrates a three-dimensional computer model 200 of a city. The three dimensional model can be used, for example, to store information about delivery routes and delivery workflow sites. A delivery route can include instructions about an order in which deliveries should be made, navigation instructions to traverse the city from delivery workflow site to delivery workflow site, and other information. Delivery routes will be discussed in further detail in the following figures. A delivery workflow site corresponds to a geographic subdivision of the model where a delivery workflow is performed to complete a delivery. The geographic subdivision could correspond to a single building or a group of related buildings (e.g., an apartment building, a residential subdivision/neighborhood, an office building, an office park of multiple office buildings, a city block, etc.). Multiple different delivery workflows can be mapped to the same delivery workflow site (e.g., deliveries to the same building, same neighborhood, city block, etc.). Similar models can be used for other geographies serviced by a carrier or delivery agent.

Figure 3:
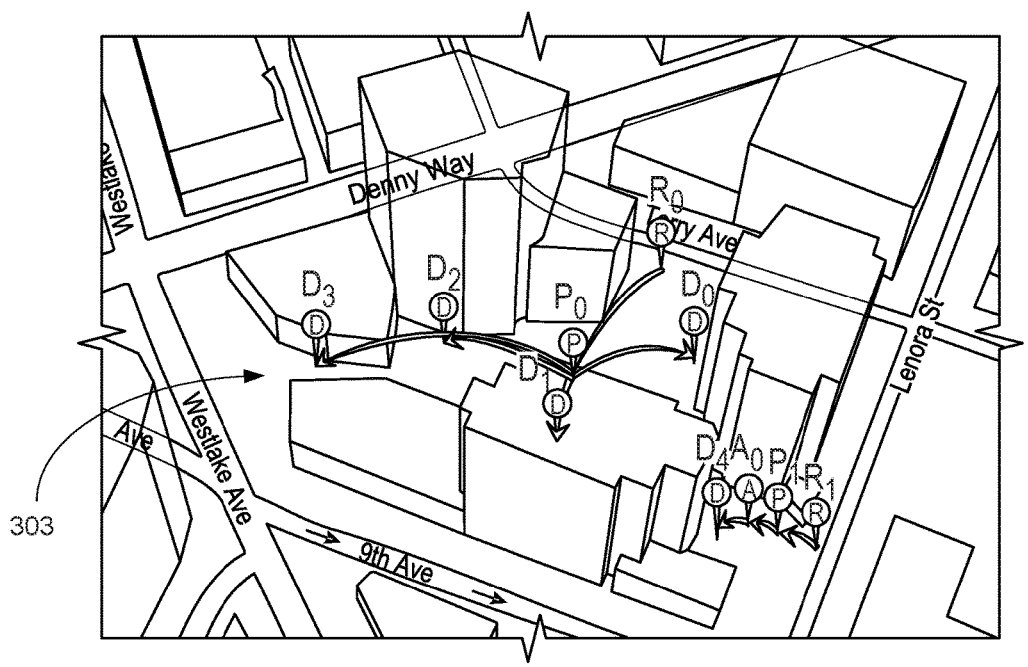
FIG. 3 is a drawing depicting a three-dimensional model used in various embodiments of the present disclosure.

FIG. 3 illustrates an example of multiple delivery workflows within a delivery workflow site 303. The delivery workflow site 303 illustrated represents a cluster of related office buildings on a city block. As illustrated, there are five delivery workflows, defined by the paths comprising the following nodes:

$R_0 \rightarrow P_0 \rightarrow D_0$
$R_0 \rightarrow P_0 \rightarrow D_1$
$R_0 \rightarrow P_0 \rightarrow D_2$
$R_0 \rightarrow P_0 \rightarrow D_3$ $R_1 \rightarrow P_1 \rightarrow A_0 \rightarrow D_4$ Routing nodes (e.g., $R_0$ and $R_1$) represent navigational waypoints, such as locations or other way points in a road network. Parking nodes (e.g., $P_0$ and $P_1$) represent locations for parking a delivery vehicle, such as on-street parking, parking lots, parking decks, garages, etc. Access nodes (e.g., $A_0$) represent access points that must be traversed to reach a delivery destination, such as delivery entrances to buildings, guard houses (e.g., for a subdivision), gates (e.g., to an apartment complex), and similar access points. Destination nodes (e.g., $D_0$, $D_1$, $D_2$, $D_3$, and $D_4$) represent delivery locations.

As illustrated, there are two groups of delivery workflows for the same delivery worksite. The first group of delivery workflows are those that begin by navigating to $R_0$ and parking at $P_0$. The second is a delivery workflow that begins by navigating to $R_1$ and parking at $P_1$. A delivery worksite could include multiple different delivery workflows for a variety of reasons. For example, the delivery workflows beginning with $R_0 \rightarrow P_0$ could correspond to a courier or mail delivery to individual buildings while the delivery workflow beginning with $R_0 \rightarrow P_0$ could correspond to a freight delivery at a loading dock used to service all of the buildings within the delivery workflow site 303.

Figure 4:
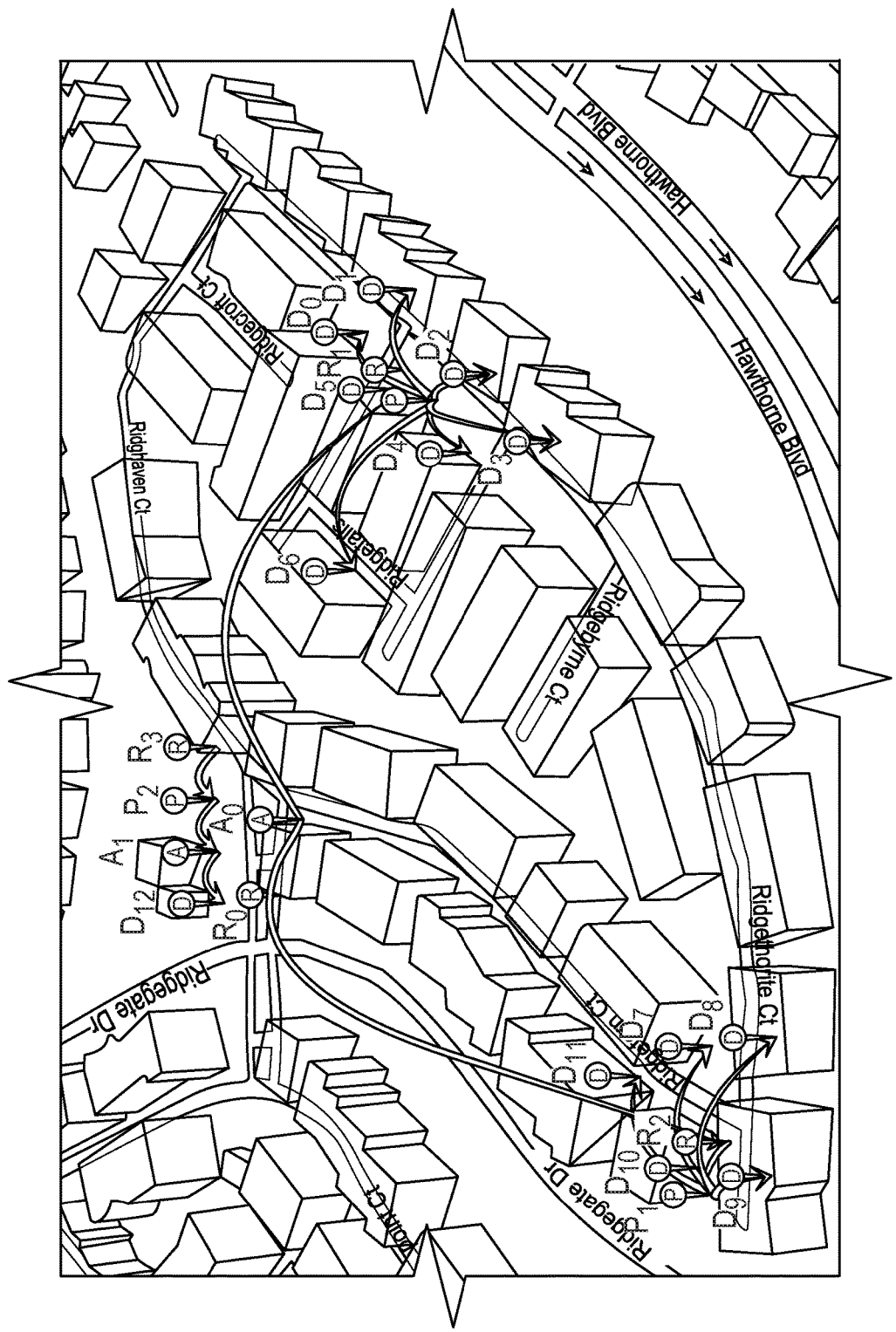
FIG. 4 is a drawing depicting a three-dimensional model used in various embodiments of the present disclosure.

FIG. 4 illustrates an example of multiple delivery workflows within a second example of a delivery workflow site 403. The delivery workflow site 403 illustrated represents a cluster of homes within a subdivision. As illustrated, there are a number of delivery workflows, such as:

$R_0 \rightarrow A_0 \rightarrow R_1 \rightarrow P_0 \rightarrow D_0$ (as well as $D_1, D_2, D_3, D_4, D_5$, and $D_6$)

$R_0 \rightarrow A_0 \rightarrow R_2 \rightarrow P_1 \rightarrow D_7$ (as well as $D_8, D_9, D_{10}$, and $D_{11}$)

$R_0 \rightarrow A_0 \rightarrow R_3 \rightarrow P_2 \rightarrow A_1 \rightarrow D_{12}$.

As evident from the listing of the workflows, there are three groups of delivery workflows corresponding to three unique combinations of routing, access, and parking nodes. Accordingly, the deliveries to $D_0, D_1, D_2, D_3, D_4, D_5$, and $D_6$ could be assigned to the same delivery route or vehicle, deliveries to $D_8, D_9, D_{10}$, and $D_{11}$ the same delivery route or vehicle, while a delivery to $D_{12}$ could be assigned to its own delivery route or vehicle. In another instance, deliveries to $D_0, D_1, D_2, D_3, D_4, D_5, D_6, D_8, D_9, D_{10}, D_{11}$, and $D_{12}$ could all be assigned to the same delivery vehicle on a single delivery route, with delivery stops scheduled at $P_0$, $P_1$, and $P_2$.

Figure 5:
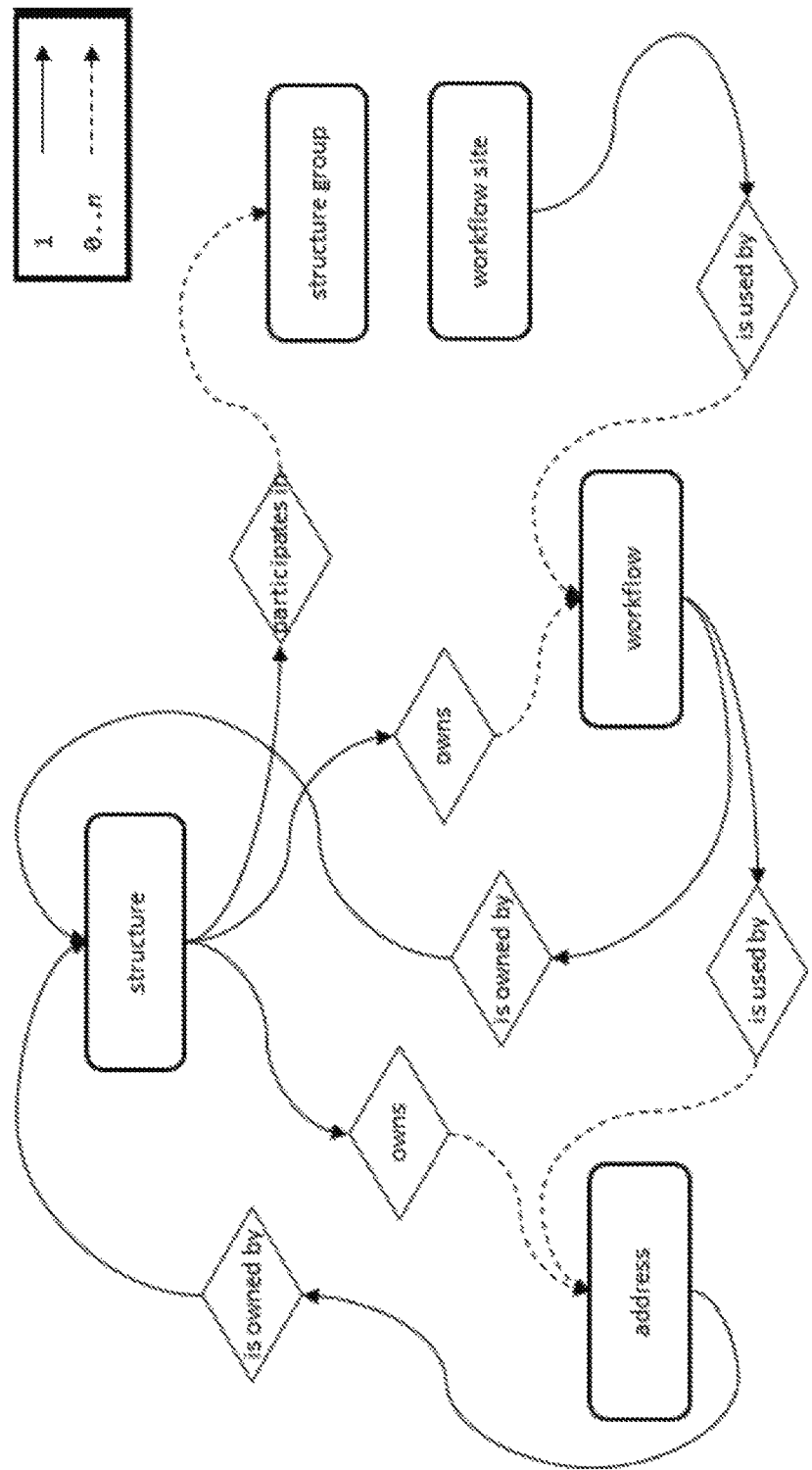
FIG. 5 is a drawing depicting a relationship between various data structures according to various embodiments of the present disclosure.

FIG. 5 represents the data model of different entities and the relationships between different entities in various embodiments of the present disclosure. The data model is used to track, annotate, and route deliveries in various embodiments of the present disclosure. Solid lines indicate a 1:1 relationship. Dashed lines represent a one-to-many relationship.

As illustrated, any given delivery workflow site can be used by multiple delivery workflows. However, while a single delivery workflow can be used by multiple addresses, any individual delivery workflow can only be owned by a single structure. For example, multiple addresses (e.g., apartments or office suites) may be located within a single building. Therefore, the same delivery workflow for a building can be used for multiple addresses. Likewise, while each address is owned by a single building, a building can own multiple addresses. For example, the addresses 123 Main St., Apt 1; 123 Main St. Apt. 2; and 123 Main St., Apt. 3 are separate addresses that map to the same building. Further, any single structure can participate in any number of structure groups. For example, a structure could be within a first structure group representing a group of houses in a neighborhood or subdivision and a second structure group representing a group of houses on the same street.

Figure 6:
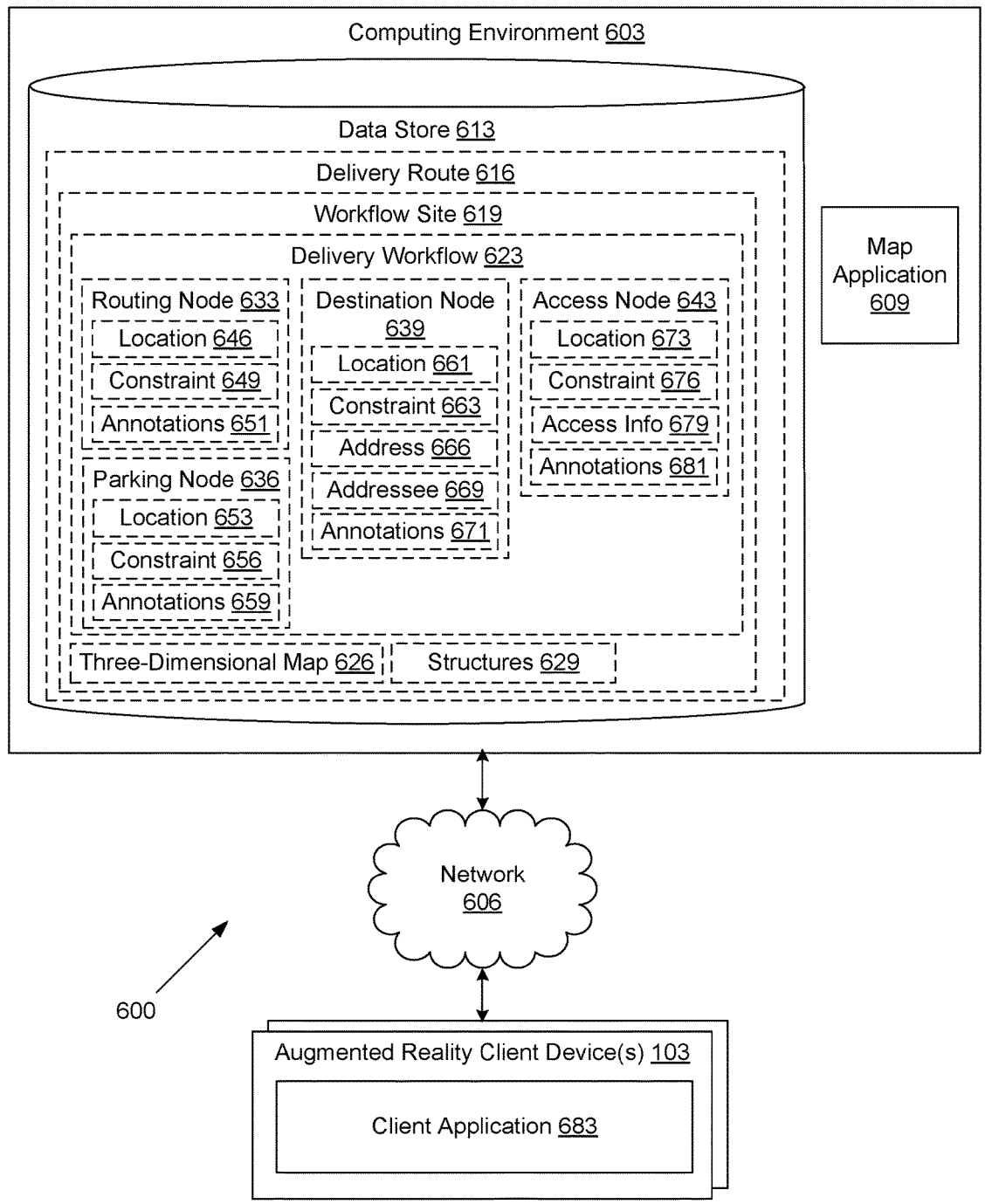
FIG. 6 is a drawing of a networked environment according to various embodiments of the present disclosure.

With reference to FIG. 6, shown is a networked environment 600 according to various embodiments. The networked environment 600 includes a computing environment 603 and an augmented reality client device 103, which are in data communication with each other via a network 606. The network 606 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 606 can also include a combination of two or more networks 606. Examples of networks 606 can include the Internet, intranets, extranets, virtual private networks (VPNs), and similar networks.

The computing environment 603 may include, for example, a server computer or any other system providing computing capability. Alternatively, the computing environment 603 may employ a plurality of computing devices that may be arranged, for example, in one or more server banks or computer banks or other arrangements. Such computing devices may be located in a single installation or may be distributed among many different geographical locations. For example, the computing environment 603 may include a plurality of computing devices that together may include a hosted computing resource, a grid computing resource or any other distributed computing arrangement. In some cases, the computing environment 603 may correspond to an elastic computing resource where the allotted capacity of processing, network, storage, or other computing-related resources may vary over time.

Various applications or other functionality may be executed in the computing environment 603 according to various embodiments. The components executed on the computing environment 603, for example, include a map application 609, and other applications, services, processes, systems, engines, or functionality not discussed in detail herein.

Also, various data is stored in a data store 613 that is accessible to the computing environment 603. The data store 613 may be representative of a plurality of data stores 613, which can include relational databases, object-oriented databases, hierarchical databases, hash tables or similar key-value data stores, as well as other data storage applications or data structures. The data stored in the data store 613 is associated with the operation of the various applications or functional entities described below. This data can include a delivery route 616 and potentially other data.

The map application 609 is executed to create, modify, and update delivery routes 616 stored in the data store 613. Accordingly, the map application 609 may collect data from a variety of sources. In some instances, the map application 609 can also be executed to provide information regarding a delivery route 616, or portion thereof, to an augmented reality client device 103.

The delivery route 616 represents a route traversed by a delivery vehicle or delivery agent to deliver items to a destination. Accordingly, a delivery route 616 can include directions or other navigational data for the delivery vehicle to use to arrive at the destination of the delivery. A destination can be represented as workflow site 619. Accordingly, a delivery route 616 can include one or more workflow sites 619 where an item can be delivered.

A workflow site 619 represents a location where a delivery workflow 623 can be performed by a delivery agent to complete a delivery. Accordingly, one or more delivery workflows 623 can be assigned to a workflow site 619 For example, in a multitenant building (e.g., apartment building, office complex, condominium complex, etc.), a separate delivery workflow 623 may be assigned to a workflow site 619 for each tenant. Additional delivery workflows 623 can also be assigned to a workflow site 619. For example, separate delivery workflows 623 for bicycle messengers, light trucks, heavy trucks, and other vehicles may be assigned to a workflow site 619.

A workflow site 619 can also include additional information, such as a three-dimensional (3D) map 626 of the workflow site 619 and a list of structures 629 within the workflow site. The 3D map 626 corresponds to a three-dimensional representation of the area encompassed or defined by the workflow site 619. This can include a map of buildings, roads, plazas, parking lots or spaces, and other features of the workflow site 619. The list of structures 629 includes a list of the building within a workflow site to which deliveries can be made. This can include, for example, a list of apartment buildings in an apartment complex, a list of office buildings in an office park, a list of buildings on a city block, and similar information.

A delivery workflow 623 represents a series of waypoints to be traversed at a workflow site 619 in order for a delivery agent to complete a delivery. Each waypoint can be represented by a node in the delivery workflow 623. For example, a delivery workflow 623 can include routing nodes 633, parking nodes 636, destination nodes 639, and access nodes 643.

A routing node 633 represents a navigational waypoint on a delivery route 616 that a delivery agent would traverse. A routing node 633 could represent, for example, an intersection of two or more streets, a location on a street (e.g., in front of a building), or some other location within a road network. In various embodiments, a routing node 633 may be used as an entry point for a delivery workflow 623 (e.g., drive to a specific intersection or drive in front of a building to begin delivery).

Accordingly, a routing node 633 can include various types of information, such as a location 646 of the routing node 633, one or more constraints 649 related to the routing node 633, and one or more annotations 651 related to the routing node. The location 646 can represent a corresponding physical location represented by the routing node 633. For example, the location 646 can be represented as a coordinate pair (e.g., latitude and longitude), a landmark (e.g., a statue, sign, building or similar structure, plaza or square, intersection, or other identifying geographical feature), or other identifier. The constraints 649 represent limitations on the use of the routing node 633. For example, a constraint 649 could include vehicle restrictions (e.g., height limits, width limits, weight limits, type or class of vehicle, etc.), toll information (e.g., toll amount, payment types, etc.), time restrictions (e.g., travel is prohibited between certain hours), traffic restrictions (e.g., local traffic only, no through traffic, one-way), and other limitations. Annotations 651 include additional notes or other relevant information that have been entered or submitted by previous delivery agents. Annotations 651 can include, for example, additional description of the location represented by the routing node 633.

A parking node 636 represents a location where a delivery agent can park a delivery vehicle when delivering an item. A parking node 636 can, for example, represent a bicycle rack, a parking spot (e.g., on street parking), a parking lot, a parking deck, or other parking structure or location. In some instances, a delivery workflow 623 may omit a parking node 636 from the delivery workflow 623 (e.g., for delivery agents on foot).

Accordingly, a parking node 636 can include various types of information, including a location 653, one or more constraints 656, or one or more annotations 659. The location 653 can represent a corresponding physical location represented by the parking node 636. For example, the location 646 can be represented as a coordinate pair (e.g., latitude and longitude), a landmark (e.g., a statue, sign, building or similar structure, plaza or square, intersection, or other identifying geographical feature), or other identifier. The constraints 656 represent limitations on the use of the parking spot represented by the parking node 636. For example, a constraint 656 could include vehicle restrictions (e.g., height limits or weight limits for parking deck, vehicle limits for parking spot such "compact car only" or "motorcycle only", etc.), parking meter information (e.g., meter rate, payment types, etc.), time restrictions (e.g., parking is prohibited between certain hours, parking is metered between certain hours, etc.), access restrictions (e.g., parking permit required), and other limitations. Annotations 659 include additional notes or other relevant information that have been entered or submitted by previous delivery agents. Annotations 659 can include, for example, a description of the parking place or its location (e.g., side of the street), how to access parking (e.g., turn right into the alley between the pizzeria and the bowling alley), or other information (e.g., parking spot requires parallel parking, bike rack is inside foyer of building, etc.)

A destination node 639 represents the delivery destination for an item or packing being delivered. A destination node 639 can, for example, represent an individual at a specific address (e.g., "Jane Doe, 123 Main St., Ste. 500, City, State 12345"). Multiple destination nodes 639 can map to the same address (e.g., roommates or family members living at the same address).

Accordingly, a destination node 639 can include various types of information, such as a location 661, a constraint 663, an address 666, an addressee 669, and one or more annotations 671. The location 661 can represent a corresponding physical location represented by the destination node 639. For example, the location 661 can be represented as a building entrance (e.g., main entrance, delivery entrance, etc.), a floor of a building, or other location. The constraint 663 can represent various constraints on delivering an item, such as hours of operation of a business or mail room, a time window in which someone is available to sign for a delivery (e.g., only home after 6:30 p.m. to sign for packages), and other limitations. The address 666 represents the a postal address of the destination for the delivery and may be used, for example, for determining whether a destination node 639 should be included on a delivery route 616 or within a set of destinations encompassed by a workflow site 619. The addressee 669 represents the individual or entity to whom or to which a delivery is to be made. Annotations 671 include additional notes or other relevant information that have been entered or submitted by previous delivery agents. With respect to destination nodes 639, annotations 671 could include a physical description of the addressee 669, notes about preferred locations for leaving packages (e.g., by front door, by garage door, backyard, with receptionist, etc.), notes about delivery hazards (e.g., guard dogs, slippery walkways, or other hazards), notes to assist in finding the delivery location (e.g., entrance to basement apartment is in back of building, loading dock or receiving area is located in adjacent building, etc.), and other information useful to other delivery agents.

An access node 643 represents an access point that controls access to the next node in a delivery workflow 623. An access node 643 can, for example, represent a security gate, a guard house for a gated community, a locked door, or similar access control mechanism. In some instances, a delivery workflow 623 may omit an access node 643, such as in those delivery workflows 623 where no access control mechanisms are to be traversed or engaged.

Accordingly, an access node 643 can store various types of information, including a location 673, a constraint 676, access information 679, and one or more annotations 681. The location 673 can indicate a physical location of the access point represented by the access node 643. For example, the location 673 can be represented as a building entrance (e.g., security desk at front entrance or delivery entrance/loading dock), a portion of a building (e.g., locked door within a building), a location within a workflow site 619 (e.g., a gate to a backyard), or other physical location. A constraint 676 can represent one or more limitations on the use of the access point represented by the access node 643. For example, a constraint 676 could include hours of use (e.g., unlocked during business hours, locked round-the-clock, staffed with security after business hours only, staffed with security around the clock, etc.), a list of authorized personnel, users, or vehicles (e.g., delivery trucks only at the loading dock or delivery entrance), and potentially other limitations. An access node 643 can also optionally store access information 679 that can be used to traverse the access point represented by the access node 643 (e.g., gate code, location of key box, electronic pass, etc.). Annotations 681 include additional notes or other relevant information that have been entered or submitted by previous delivery agents. With respect to access nodes 643, annotations 681 could include notes to assist in interacting with access point (e.g., key box is locate on left wall, etc.), and other information useful to other delivery agents.

The augmented reality client device 103 is representative of a plurality of augmented reality client devices 103 that may be coupled to the network 606. The augmented reality client device 103 may include, for example, a processor-based system such as a computer system. Such a computer system may be embodied in the form of a mobile computing device (e.g., personal digital assistants, cellular telephones, smartphones, web pads, tablet computer systems, music players, portable game consoles, electronic book readers, and similar devices), a wearable computing device (e.g., watches, glasses, goggles, headsets, or similar items), or other computing device carried by a user. The augmented reality client device 103 may include one or more displays. The displays may be integrated into or communicatively coupled to the augmented reality client device 103. For example, an augmented reality headset may have an integrated display while a smartphone or smartwatch may be communicatively coupled to a display (e.g., glasses, goggles, etc.) worn by the user.

The augmented reality client device 103 may be configured to execute various applications such as a client application 683 or other applications. The client application 683 may be executed in an augmented reality client device 103, for example, to access content served up by the computing environment 603 or other servers, thereby rendering a user interface on the display. The augmented reality client device 103 may be configured to execute applications beyond the client application 683 such as, for example, messaging applications, social networking applications, navigation applications, or other applications.

Next, a general description of the operation of the various components of the networked environment 600 is provided. To begin, the map application 609 creates and stores a delivery workflow 623 for a workflow site 619. The delivery workflow 623 can be created manually or discovered automatically based at least in part on tracking delivery patterns of one or more delivery agents.

As a first example, a delivery agent could enter a delivery workflow 623 after making a delivery to record the most efficient sequence of steps to be performed (e.g., parking at a particular location to most quickly and easily access a loading dock to deliver packages to a particular destination). In some instances, delivery agents could be required to create and enter new delivery workflows 623 or modify existing delivery workflows 623 after completing all of their deliveries for the day. This would allow for a set of delivery workflows 623 for any given workflow site 619 to be created and updated organically as delivery agents become more familiar with the locations to which they make deliveries.

As a second example, the map application 609 could track the movements or patterns of movements of individual delivery agents in order to identify potential delivery workflows 623. For instance, the map application 609 could use a global positioning system (GPS) location transmitter mounted to delivery trucks to determine that heavy delivery trucks drive to the same waypoint and park in the same location to deliver items to a given workflow site 619. Accordingly, the map application 609 could create separate delivery workflows 623 comprising a routing node 633, a parking node 636, and a respective destination node 639 for each addressee 669. The map application 609 could also add some details to the newly created delivery workflow 623, such as the location 646 of the routing node; the location 653 of the parking node 636; and the location 661, address 666, and addressees 669 of each destination node 639 for each of the delivery workflows 623 created. The map application 609 could also infer constraints 649, 656, and 663 for the routing node 633, the parking node 636, and the destination node 639, such as "heavy vehicle only." These delivery workflows 623 could then be updated later by delivery agents attempting to follow the delivery workflow 623 or the map application 609 as further information becomes available.

Subsequently, a delivery agent navigating a delivery route 616 may be routed to a workflow site 619 to complete one or more deliveries. As the delivery agent approaches the workflow site 619, the client application 683 may notify the map application 609 that the delivery agent is approaching the workflow site 619. In response, the map application 609 may provide one or more delivery workflows 623, each of which corresponds to a respective delivery to be completed at the workflow site 619. The map application 609 may also, in some instances, flag or otherwise indicate which delivery workflows 623 share a common workflow subgraph (e.g., begin with the same ordered combination of routing nodes 633, parking nodes 636, and access nodes 643).

The client application 683 can then provide information regarding individual nodes in a delivery workflow 623 to the delivery agent. For example, the client application 683 could render a marker over a waypoint on a road (e.g., intersection, location on street or road in front of structure, etc.) on a display 105 (FIG. 1) of the augmented reality client device 103 (e.g., render a marker on goggles, glasses, or a similar wearable display 105). As another example, the client application 683 could cause the augmented reality client device 103 to render at three-dimensional hologram for the user to view that illustrates the location of the way point as represented by a routing node 633. As the delivery agent passes the location represented by the first node in the delivery workflow 623, the client application 683 could similarly cause the augmented reality client device 103 to render a marker over a next location represented by a next node in the delivery workflow 623. This process could be repeated until the delivery workflow 623 is completed, as indicated by the delivery agent traversing every node in the delivery workflow 623 and performing any corresponding or respective actions (e.g., parking vehicle, delivering package, etc.).

In instances, where multiple delivery workflows 623 that share a common subgraph of nodes were provided to the client application 683, the client application 683 may begin navigation for the next delivery workflow 623 at the end of the common subgraph of nodes. For example, a delivery route 616 may contain two separate delivery workflows 623 for the same workflow site 619. Both delivery workflows 623 may share a common subgraph between a routing node 633, a parking node 636, and an access node 643, but have different destination nodes 639. For instance, the first delivery workflow may include the nodes $R_0 \rightarrow P_0 \rightarrow A_0 \rightarrow D_0$ representing a delivery workflow 623 of navigating to a segment of 123 Main Street in front of a structure 629 (e.g., routing node 633 $R_0$, parking in an on-street parallel parking spot (e.g., parking node 636 $P_0$), and signing in at a security desk in the lobby (e.g., access node 643 $A_0$), and delivering a package to an office on the fifth floor (e.g., destination node 639 $D_0$). However, a second delivery workflow 623 for a second delivery to the same workflow site 619 may include the nodes $R_0 \rightarrow P_0 \rightarrow A_0 \rightarrow D_1$, representing a workflow for delivering a package to a second office on the fifteenth floor (e.g., destination node 639 $D_1$) of the same building. Accordingly, after completing the first delivery workflow 623, the client application 683 could display a marker or other identifier to represent the location 661 of the second destination node 639 within the building instead of rendering the entire second delivery workflow 623.

As the delivery agent navigates a delivery route 616 to make deliveries, the delivery agent may use the augmented reality client device 103 to record and provide information to be stored as annotations for individual nodes in the delivery workflow 623. For example, the delivery agent could use the augmented reality client device 103 to record a verbal description of the location 646 for a routing node 633 and send a transcript to the map application 609 to be stored as annotation 651 of the routing node 633. As another example, the delivery agent could use the augmented reality client device 103 to record a video as the delivery agent moves from a parking node 636 to an access node 643 (e.g., walks from parking spot in parking garage to security desk at building entrance). This video could be stored as an annotation 681 in the access node 643 to assist future delivery agents in reaching the location 673 of the access node 643 from the location 653 of the parking node 636. Various other types of information could be recorded with the augmented reality client device 103 and provided to the map application 609 to store as an annotation according to various embodiments of the present disclosure.

Figure 7:
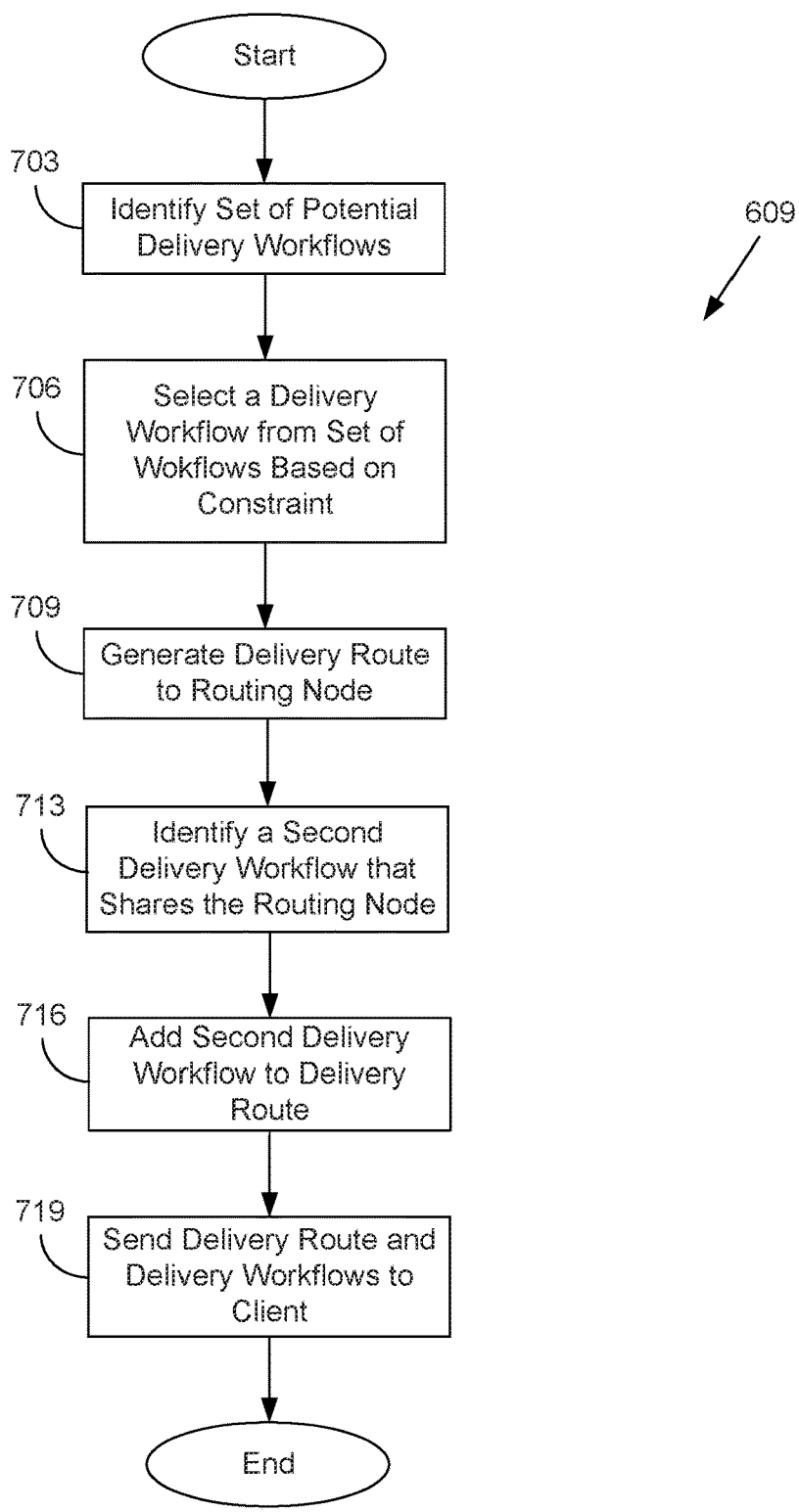
FIG. 7 is a flowchart illustrating one example of functionality implemented as portions of an application executed in a computing environment in the networked environment of FIG. 6 according to various embodiments of the present disclosure.

Referring next to FIG. 7, shown is a flowchart that provides one example of the operation of a portion of the map application 609 according to various embodiments. It is understood that the flowchart of FIG. 7 provides merely an example of the many different types of functional arrangements that may be employed to implement the operation of the portion of the map application 609 as described herein. As an alternative, the flowchart of FIG. 7 may be viewed as depicting an example of elements of a method implemented in the computing environment 603 (FIG. 6) according to one or more embodiments.

Beginning with box 703, the map application 609 identifies a set of potential delivery workflows 623 (FIG. 6). For example, if a delivery is to be made to an addressee 669 (FIG. 6) at an address 666 (FIG. 6), the map application 609 may select all delivery workflows 623 that include a destination node 639 (FIG. 6) that matches the addressee 669 and address 666.

Proceeding to box 706, the map application 609 selects a delivery workflow 623 from the set of potential delivery workflows 623 identified at box 703. The delivery workflow 623 may, for example, be selected based at least in part on whether the delivery workflow 623 satisfies one or more constraints 649, 656, 663, or 676 (FIG. 6). For example, if the delivery route 616 is serviced by a delivery vehicle, the map application 609 may determine whether any of the constraints 649, 656, 663, or 676 for any routing node 633 (FIG. 6), parking node 636 (FIG. 6), destination node 639 (FIG. 6), or access node 643 (FIG. 6) in the delivery workflow 623 preclude the presence of the delivery vehicle (e.g., weight restrictions, height restrictions, etc.). As another example, the map application may determine whether any of the constraints 649, 656, 663, or 676 for any routing node 633 (FIG. 6), parking node 636 (FIG. 6), destination node 639 (FIG. 6), or access node 643 (FIG. 6) in the delivery workflow 623 require delivery within a particular window of time (e.g., security desk only allows public access to building from 8:00 a.m. to 6:00 p.m., business hours of recipient are from 9:00 a.m. to 5:00 p.m., etc.) and predict whether delivery could be accomplished during those hours.

Moving to box 709, the map application 609 generates a delivery route 616 (FIG. 6) for a delivery agent to follow to reach the routing node 633 corresponding to the initial step in the delivery workflow 623. However, the map application 609 may, in some alternative embodiments, instead insert the delivery workflow 623 into a preexisting delivery route 616. Further, use of the routing node 633 to represent a waypoint in a road network and an initial step in a delivery workflow 623 allows for delivery workflows 623 to be injected into a road network and delivery routes 616 to represent a navigational route between a series of delivery workflows 623 in addition to or instead of a series of stops.

Referring next to box 713, the map application 609 can identify a second delivery workflow 623 that shares at least the same initial routing node 633 as the first delivery workflow 623. A second delivery workflow 623 could be identified for any number of purposes. Several examples are provided below.

As a first example, the map application 609 could attempt to consolidate multiple deliveries by selecting a second delivery workflow 623 for a second delivery that shares at least the same initial routing node 633 as the first delivery workflow 623. Further efficiencies may be achieved if the map application 609 further selects the second delivery workflow 623 based on a shared ordered combination of nodes (e.g., a shared initial set of routing nodes 633, parking nodes 636, or access nodes 643). In some instances, the second delivery workflow 623 may further be selected based at least in part on whether any constraints 649, 656, 663, or 676 of the second delivery workflow 623 conflict with any constraints 649, 656, 663, or 676 of the first delivery workflow 623 (e.g., the first delivery workflow 623 is assigned to a delivery route for a heavy delivery vehicles and the second delivery workflow 623 involves one or more constraints prohibiting heavy delivery vehicles).

As a second example, the map application 609 could identify alternative, secondary, or back-up delivery workflows 623. For example, if the first delivery workflow 623 were unable to be completed, the second delivery workflow 623 could be used by a delivery agent to complete delivery. For instance, if a delivery agent were unable to deliver a package to an office suite represented by a destination node 639 (e.g., office was closed), the delivery agent could rely upon a secondary delivery workflow 623 to deliver the package to the main mailroom of the office building, as represented by a second delivery workflow 623 that shares at least the same initial routing node 633 as the first delivery workflow 623.

Proceeding to box 716, the map application 609 can add the second delivery workflow 623 to the delivery route 616 that includes the first delivery workflow 623.

Moving to box 719, the map application 609 then sends the delivery route 616 and the delivery workflows 623 to the augmented reality client device 103. The map application 609 may also send additional data about individual workflow sites 619 (FIG. 6) to the augmented reality client device 103. For example, the map application 609 could further provide a three-dimensional map 626 (FIG. 6) and information about individual structures 629 (FIG. 6) within the workflow site 619 to a client application 683 (FIG. 6) executing on the augmented reality client device 103. Execution of the process then subsequently ends.

In some embodiments, the process depicted in FIG. 7 and described above may be performed repeatedly. For example, the process depicted in FIG. 7 could be performed initially to generate a set of delivery workflows to be performed by a delivery agent prior to beginning a delivery route 616. However, the process could then be subsequently performed to generate updates to the delivery route 616 and provide those updates to the delivery agent. For example, updates could be generated in response to order changes, delivery failures, or other events.

Figure 8:
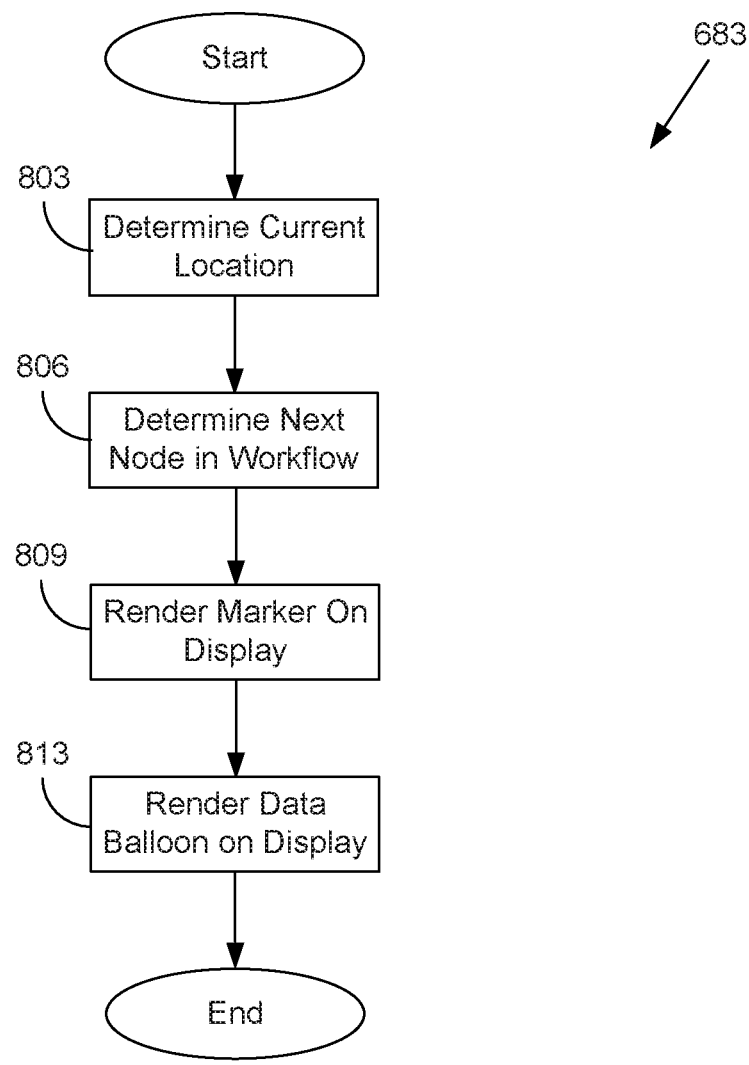
FIG. 8 is a flowchart illustrating one example of functionality implemented as portions of an application executed in a computing environment in the networked environment of FIG. 6 according to various embodiments of the present disclosure.

Referring next to FIG. 8, shown is a flowchart that provides one example of the operation of a portion of the client application 683 according to various embodiments. It is understood that the flowchart of FIG. 8 provides merely an example of the many different types of functional arrangements that may be employed to implement the operation of the portion of the client application 683 as described herein. As an alternative, the flowchart of FIG. 8 may be viewed as depicting an example of elements of a method implemented in the augmented reality client device 103 (FIG. 6) according to one or more embodiments.

Beginning with box 803, the client application 683 determines the current location of the augmented reality client device 103. For example, the client application 683 could use a GPS receiver built into the augmented reality client device 103 to determine its current location. As another example, the client application 683 could identify one or more wireless networks (e.g., WiFi® networks) within broadcast range of the augmented reality client device 103 in order to determine its location. Other approaches, such as inertial navigation or other geolocation techniques, can also be used.

Proceeding to box 806, the client application 683 identifies the next node in a current delivery workflow 623 (FIG. 6) being processed by the delivery agent. The determination could be based on which nodes in the delivery workflow 623 have already been completed, or other factors.

Moving to box 809, the client application 683 renders a marker 107 (FIG. 1) on the display 105 (FIG. 1) of the augmented reality client device to indicate a location of the current node. The client application 683 may take into account the distance between the current location of the augmented reality client device 103 and a location 646, 653, 661, or 673 of the next node in the delivery workflow 623. For example, if the distance is a too great to see the location 646, 653, 661, or 673 of the next node in the delivery workflow 623, the client application 683 may wait until the augmented reality client device 103 is closer to render a marker 107.

The marker 107 can take many different forms. The marker 107 can, for example, be presented as a flashing light, icon, or beacon. As another example, the marker 107 can correspond to a color overlay of the same shape and size as the structure 629 (FIG. 6) being marked.

How the marker 107 is rendered can also depend on the type of display 105 used by the augmented reality client device 103. For example, if the display 105 corresponds to an eye lens (e.g., glasses, goggles, etc.), the marker 107 may be rendered directly on the lens. If the display 105 were a holographic projection (e.g., of the workflow site 619, structure 629, etc.), then the presentation of a marked portion could be modified (e.g., changed color, changed size, etc.).

Referring next to box 813, the client application 683 can also cause a data balloon 109 (FIG. 1) to be rendered on the display 105 of the augmented reality client device 103. The data balloon 109 may be rendered in proximity to the marker 107 in order to emphasize the association between the marker 107 and the content in the data balloon 109. The data balloon 109 can include information about the marked location 646, 653, 661, or 673 of the respective routing node 633, parking node 636, destination node 639, or access node 643. This information may, for example, include a respective annotation 651, 659, 671, or 681 of a corresponding routing node 633, parking node 636, destination node 639, or access node 643.

Information within the data balloon 109 can also be presented in other forms. For example, the client application 683 could detect, based on the current orientation of the augmented reality client device 103, that a delivery agent is focused on the marker 107. In response, the client application 683 could cause the content of the data balloon 109 to be spoken to the delivery agent. As another example, the client application 683 could combine the marker 107 and data balloon 109 into a single interface element that marks a location and provides relevant information to the delivery agent. Moreover, shapes other than a "balloon" may be used to encapsulate text information displaced to the user.

Figure 9:
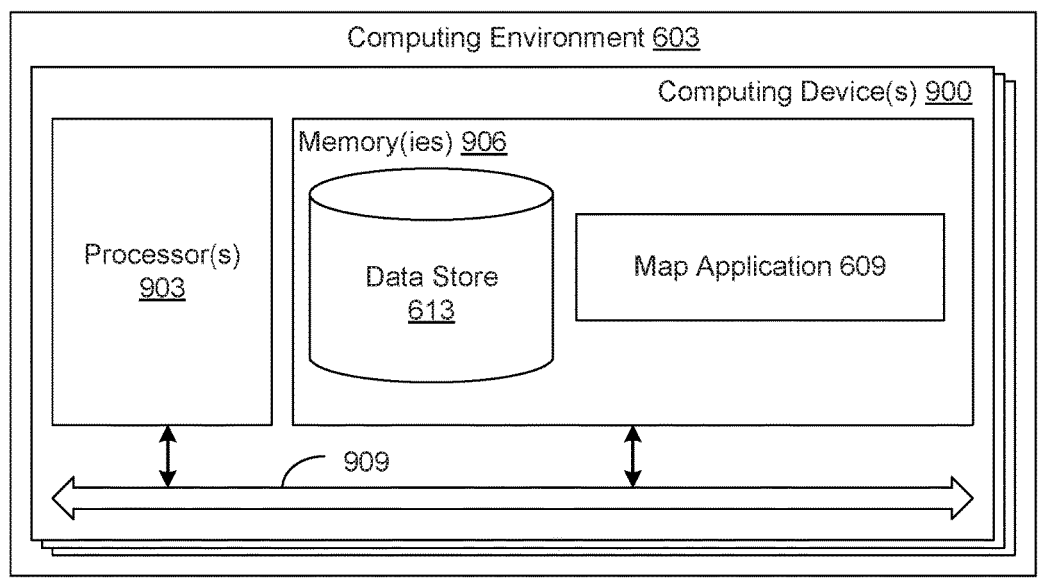
FIG. 9 is a schematic block diagram that provides one example illustration of a computing environment employed in the networked environment of FIG. 6 according to various embodiments of the present disclosure.

With reference to FIG. 9, shown is a schematic block diagram of the computing environment 603 according to an embodiment of the present disclosure. The computing environment 603 includes one or more computing devices 900. Each computing device 900 includes at least one processor circuit, for example, having a processor 903 and a memory 906, both of which are coupled to a local interface 909. To this end, each computing device 900 may include, for example, at least one server computer or like device. The local interface 909 may include, for example, a data bus with an accompanying address/control bus or other bus structure as can be appreciated.

Stored in the memory 906 are both data and several components that are executable by the processor 903. In particular, stored in the memory 906 and executable by the processor 903 is the map application 609, and potentially other applications. Also stored in the memory 906 may be a data store 613 and other data. In addition, an operating system may be stored in the memory 906 and executable by the processor 903.

It is understood that there may be other applications that are stored in the memory 906 and are executable by the processor 903 as can be appreciated.

Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 903 may represent multiple processors 903 or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906. The local interface 909 may include additional systems designed to coordinate this communication, including, for example, performing load balancing. The processor 903 may be of electrical or of some other available construction.

Although the map application 609, the client application 683, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 8 and 9 show the functionality and operation of an implementation of portions of the map application 609 and the client application 683, respectively. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 903 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIGS. 8 and 9 show a specific order of execution, it is understood that the order of execution may differ from that which is depicted. For example, the order of execution of two or more blocks may be scrambled relative to the order shown. Also, two or more blocks shown in succession in FIGS. 8 and 9 may be executed concurrently or with partial concurrence. Further, in some embodiments, one or more of the blocks shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the map application 609 the client application 683, that includes software or code can be embodied in any non-transitory computer-readable medium for use by or in connection with an instruction execution system such as, for example, a processor 903 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the map application 609 and the client application 683, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 900, or in multiple computing devices in the same computing environment 603.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   an application comprising machine readable instructions stored in the memory that, when executed by the processor, cause the computing device to at least:
      receive an annotation from a first augmented reality client device for a node in a delivery workflow;
      add the annotation to the node in the delivery workflow;
      identify a plurality of delivery workflows that include the node;
      select the delivery workflow from the plurality of delivery workflows based at least in part the delivery workflow having a routing node that is compatible with a vehicle constraint associated with a delivery, the routing node comprising a navigational waypoint on a delivery route to a destination node;
      add the delivery workflow to the delivery route; and
      send the delivery route to a second augmented reality client device, wherein the second augmented reality client device is configured to:
         render a three-dimensional model of an area associated with the node in the delivery workflow on an augmented reality display associated with the second augmented reality client device, wherein the three-dimensional model comprises a marker indicating a physical location corresponding to the node in the delivery workflow;
         render the annotation in association with the node on the augmented reality display associated with the second augmented reality client device; and
         wherein the augmented reality display is configured to be worn by an operator of the second augmented reality client device.

2. The system of claim 1, wherein the node represents a parking location.

3. The system of claim 1, wherein the node represents a delivery location.

4. The system of claim 1, wherein the annotation comprises a video captured by the first augmented reality client device as a delivery agent moved from a previous node to the node, and the video is stored in association with the node.

5. A system, comprising:
   a computing device comprising a processor and a memory; and
   an application comprising machine readable instructions stored in the memory that, when executed by the processor, cause the computing device to at least:
      identify a plurality of delivery workflows that include a destination node that corresponds to a delivery;
      select a delivery workflow from the plurality of delivery workflows based at least in part on a delivery constraint and the delivery workflow comprising at least one node that is compatible with a vehicle restriction associated with a vehicle being used for the delivery, the at least one node comprising a navigational routing waypoint on a delivery route to the destination node;
      generate at least a portion of the delivery route to a routing node, wherein the routing node comprises an entry to the selected delivery workflow; and
      send the delivery route and the selected delivery workflow to an augmented reality client, wherein at least a portion of the selected delivery workflow is rendered using a three-dimensional model that comprises a mark of a physical location of the routing node.

6. The system of claim 5, wherein the machine readable instructions that cause the computing device to at least identify the plurality of delivery workflows further comprise machine readable instructions stored in the memory that, when executed by the processor, cause the computing device to at least:
   match a first address specified in the destination node to a second address corresponding to the delivery; and
   match an addressee specified in the destination node to a recipient corresponding to the delivery.

7. The system of claim 5, wherein:
   the selected delivery workflow comprises a first delivery workflow;
   the destination node of the first delivery workflow comprises a first destination node; and the application further comprises machine readable instructions stored in the memory that, when executed by the processor, cause the computing device to further:
identify a second delivery workflow that comprises the routing node of the first delivery workflow, the delivery constraint of the first delivery workflow, and a second destination node; and
add the second delivery workflow to the delivery route to the routing node.

8. The system of claim 5, wherein the routing node represents a navigational waypoint.

9. The system of claim 5, wherein the delivery constraint comprises a method of delivery.

10. The system of claim 5, wherein:
the routing node is limited to a method of delivery; and
the machine readable instructions that cause the computing device to select a delivery workflow from the plurality of delivery workflows based at least in part on the delivery constraint further comprise machine readable instructions stored in the memory that, when executed by the processor, cause the computing device to at least determine that each routing node within the delivery workflow specifies the method of delivery as a valid method of delivery for the routing node.

11. The system of claim 5, wherein the delivery constraint comprises a time of delivery.

12. The system of claim 5, wherein the physical location is a first physical location, and the selected delivery workflow further comprises an access node that includes access instructions for a delivery agent to access a second physical location represented by the destination node.

13. The system of claim 5, wherein the physical location is a first physical location, and wherein the selected delivery workflow further comprises a parking node that specifies a second physical location for a delivery agent to park when attempting delivery to a third physical location represented by the destination node.

14. A method, comprising:
determining, via a client device, a current location of the client device using a receiver associated with the client device;
determining, via the client device, a next node in a delivery workflow based at least in part on the current location of the client device and a vehicle restriction associated with a vehicle being used in association with the client device, wherein the next node comprises a navigational routing waypoint on a delivery route to a destination node and is compatible with the vehicle restriction associated with the vehicle;
rendering, via the client device, the next node in the delivery workflow on an augmented reality display linked to the client device; and
rendering, via the client device, a marker on the augmented reality display, wherein the marker comprises a visual indication of a physical location corresponding to the next node in the delivery workflow.

15. The method of claim 14, further comprising:
rendering, via the client device, a data balloon on the augmented reality display in proximity to the marker, wherein the data balloon comprises information stored within the next node in the delivery workflow.

16. The method of claim 14, wherein the augmented reality display comprises a headset.

17. The method of claim 14, wherein the marker is rendered on a three-dimensional model comprising a holographic projection of the physical location of the next node.

18. The method of claim 14, wherein the next node in the delivery workflow comprises a way point on a road network.

19. The method of claim 14, wherein the next node in the delivery workflow comprises a delivery destination.

20. The method of claim 14, wherein the next node in the delivery workflow comprises a parking point.

* * * * *